Feb. 2, 1960
F. M. MAYES
2,923,880
APPARATUS FOR IMPEDANCE MEASUREMENTS
Filed May 9, 1955
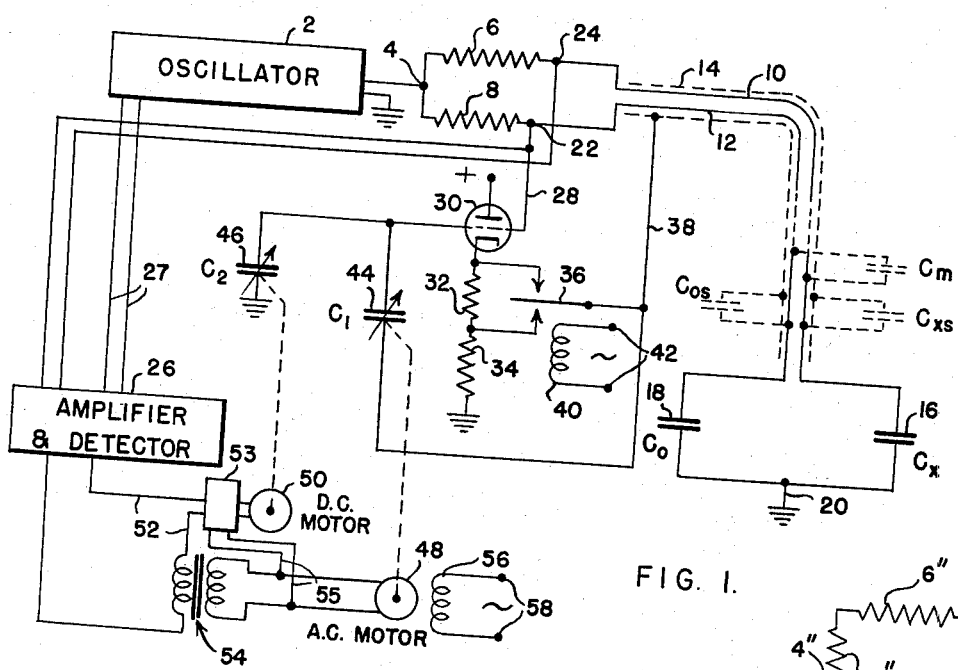
FIG. 1.
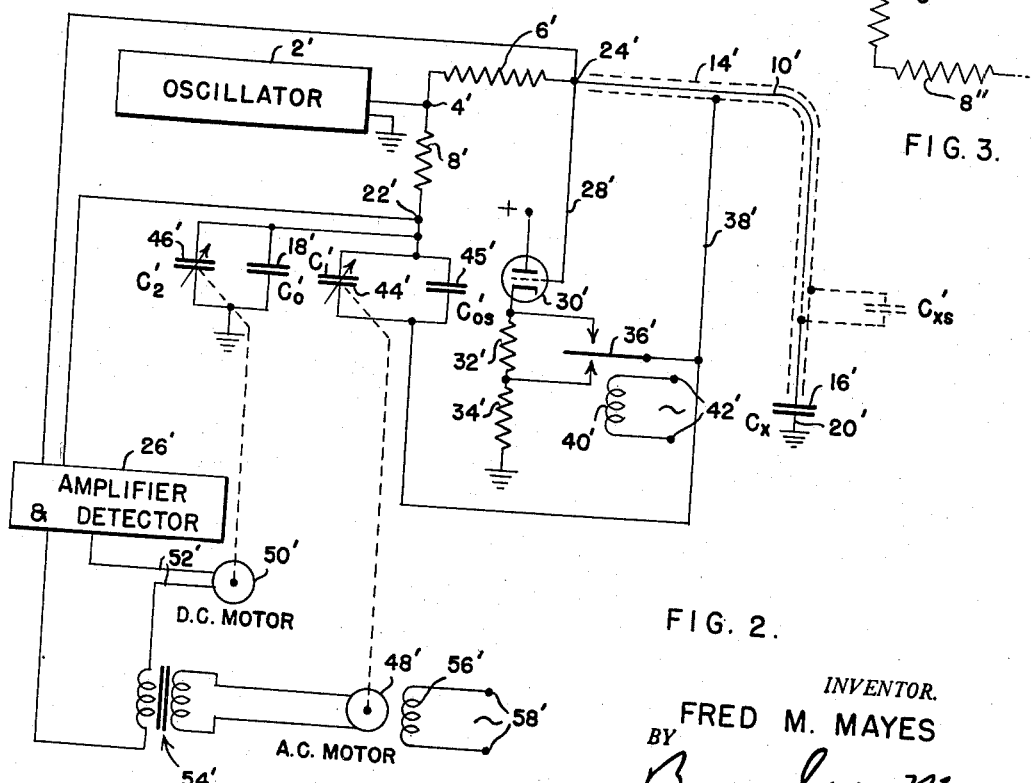
FIG. 2.
FIG. 3.
*INVENTOR.*
FRED M. MAYES
BY
Busser, Smith & Harding
ATTORNEYS

United States Patent Office 2,923,880
Patented Feb. 2, 1960

2,923,880
APPARATUS FOR IMPEDANCE MEASUREMENTS

Fred M. Mayes, Newtown Square, Pa.

Application May 9, 1955, Serial No. 506,866

5 Claims. (Cl. 324—57)

This invention relates to methods and apparatus for impedance measurements and has particular reference to the measurement of small impedance changes particularly when the impedance which is measured is required to be remote from electronic measuring apparatus.

As will appear hereafter, the word "measurement" is used in a quite broad sense, not limited to the ascertainment of numerical values, but including the production of outputs which are functionally related to the impedance and utilized for observation, recording, control, or like purposes. For simplicity in describing the invention, reference will be primarily made to measurements of small capacitances or small changes in capacitances though it will become evident that the invention is equally applicable to the measurement of impedances and small changes in impedances quite generally.

Numerous occasions arise for the measurement of capacitances but, in general, it has been necessary to associate closely with the capacitances to be measured electronic apparatus which gives rise to signals which are functions of the capacitances. For example, it has been recognized that an ideal method for measuring very small capacitances or changes in capacitances involved the utilization of the capacitance undergoing measurement as a tuning element of an oscillator, whereby high sensitivity is secured by producing beats susceptible to detection and measurement. In other cases, capacitances are measured by their incorporation in bridges, or other circuits, which are activated by alternating currents. In all such cases, vacuum tubes and associated apparatus must be located closely adjacent to the capacitances undergoing measurement or precautions must be taken to insure that any more remote connecting devices do not introduce spurious capacitances which would be added to that to be measured. In particular, troubles arise where the measurement of a capacitance is used for the detection of a level of material or for the determination of some quality of a material by utilization of changes in its dielectric constant or its conductivity. Such measurements, for example, are sometimes required to be made where the condenser providing the capacitance to be measured is necessarily at a quite high temperature, so high as to preclude exposure thereto of any but highly specially designed electronic equipment. If an attempt is made to provide a remote connection, as for example by a coaxial cable, such connection will introduce a capacitance of its own which is so large that minor changes due to temperatures or mechanical displacements will cause variations in capacitance which may be much greater than the variations requiring measurement. For example, a coaxial cable may have a distributed capacitance of about 50 micromicrofarads per foot. Yet the changes in capacitance which it may be desired to measure may be of the order of less than one micromicrofarad which, for a cable of such length as may be ordinarily required, will represent only a very small fraction of the total distributed capacitance of the cable, with the result that even minor temperature changes may produce corresponding changes in the cable capacitance completely masking the changes to be detected. The general object of the present invention is the provision of methods and apparatus for making impedance measurements while practically eliminating any effects of capacitance or other impedance changes in a connecting cable or the like. Not only may remote measurements be made without the presence of any vacuum tubes or other bulky or mechanically- or temperature-sensitive apparatus adjacent to the capacitance to be measured but, as will become more apparent hereafter, it is possible to utilize a single measuring apparatus with a plurality of cables running to impedances to be measured with the possibility of switching from one to the other without the necessity for making adjustments to compenate for the connecting lines. This independence of connections is also of major advantage in the making of field measurements where lengths and dispositions of cables, or the like, are subject to quite arbitrary variation. Thus, for example, the invention is applicable to geophysical prospecting work, such as seismographic work, where it is impractical to provide at a detector a substantial amount of electronic apparatus whereas there can be provided a quite small detector housing a capacitance-type pickup, or the like, together with a very minor amount of electrical circuitry.

The invention is applicable to automatic control and measurement, as will be pointed out hereafter. It is applicable to measurements of variations of an impedance in a bore hole wherein the variations correspond to those of some variable such as pressure, temperature, inclination, or the like.

The objects of the invention relate generally to the attainment of results such as described above, and the broad objects, as well as specific objects, particularly relating to details of apparatus and operation will become apparent from the following description read in conjunction with the accompanying drawings, in which:

Figure 1 is a wiring diagram showing one preferred form of the present invention;

Figure 2 is a similar wiring diagram showing an alternative form of the invention; and Figure 3 is a fragmentary diagram illustrating an alternative bridge balancing arrangement.

Referring to Figure 1, there is indicated at 2 an oscillator, which may be of any suitable type designed to provide an exciting current at a suitable frequency. If an impedance of low reactance is to be measured, the frequency is desirably fairly high, considerably in excess of the commercial power frequencies and, for example, in the high audio frequency range. However, as will be evident, the exciting frequency is by no means critical and may range through ordinary audio frequencies up to high radio frequencies. In fact, in some situations, the oscillator may be replaced by no more than a transformer providing excitation at 60 cycles or some other commercial power frequency. The oscillator provides its output between a terminal 4 and ground, terminal 4 providing a junction of a pair of resistors 6 and 8 of substantially equal value. These resistors are connected to a pair of insulated conductors 10 and 12 of a cable having a sheath 14. In accordance with the invention, this cable may be of any desired length, the invention permitting the measurement of impedances at a location remote from the major measuring apparatus. At the remote end of the cable, the conductors 10 and 12 are connected, respectively, to terminals of capacitors 16 and 18, the other terminals of which are grounded as indicated at 20. Desirably, the conductive sheath 14 of the cable is insulated from ground, being desirably driven to a potential approximating that of the conductors 10 and 12 as will appear later. The terminal 22 between resistor 8 and conductor 12 and the terminal 24 between resistor 6 and conductor 10 are connected to an amplifier and detector indicated at 26. This amplifier and detector unit may be of any conventional form designed, in particular, to give a combination direct and alternating output as will later appear. Desirably, it is of phase-sensitive type comprising a reference input through connections 27 from the oscillator 2.

The terminal 22 is connected at 28 to the grid of a triode 30 which is in a cathode follower circuit, there being provided between its cathode and ground a pair of resistors 32 and 34. The ends of the resistor 32 are shown as connected to a pair of contact points alternately engageable by the armature 36 of a chopper, which armature is connected at 38 to the cable sheath 14. The armature 36 is driven by the chopper coil 40 which may be excited from terminals 42 connected to the conventional 60 cycle power supply. In the event, however, that the excitation at terminal 4 is at power supply frequency, the chopper will, of course, be operated at a different lower frequency.

A variable capacitor 44 is connected between terminal 22 and sheath 14. A second variable capacitor 46 is connected between terminal 22 and ground. The output of the amplifier and detector 26 is connected at 52 through an amplifier 53 to drive a direct current motor 50 to drive the capacitor 46, and is connected through a transformer 54 to excite the armature of an alternating current motor 48 which drives the capacitor 44, the motor 48 being provided with a field 56 which is excited from the terminals 58 connected to the same alternating current source as the terminals 42. The alternating current motor by reason of the arrangement shown is phase-sensitive, and is driven in one direction or the other depending upon the phase of the output of the amplifier and detector 26 compared with the phase of the field input at terminals 58. The direct current motor 50 desirably is provided with a permanent magnet field so that this motor operates reversely depending upon the direction of current input through connection 52 and amplifier 53. Desirably, the amplifier 53 is subject to automatic gain control through connections 55 from the output of transformer 54 so as to drive motor 50 only when the signal through connections 55 is small.

In the arrangement illustrated in Figure 1 and above described, it may be assumed that the capacitance at 16 having the value $C_x$ is the capacitance which is to be measured (or used for control or other purposes) and varies in accordance with some variable such as a bed level, dielectric constant, displacement, or the like. The capacitance 18, having the value $C_0$ may be assumed to be a capacitance having a value smaller than the minimum of capacitance $C_x$, but provided for comparison and, possibly, serving to substantially completely or partially balance out some variable which it may not be desired to measure. For example, if $C_x$ is to be a measurement of the level of a liquid which might be subject to temperature variations and change of dielectric constant, the liquid forming the dielectric of the capacitance 16, the capacitance 18 may be totally immersed in the same liquid and by reason of variation of capacitance with temperature will serve for partial compensation of temperature variations which are desirably to be eliminated from the measurement. For the specific description of Figure 1, it may be assumed that the capacitance $C_0$ is constant or variable only in response to some variable to be substantially balanced out. In dotted lines at the right-hand side of Figure 1 there are shown several capacitances which are incidental but which in systems heretofore used would constitute highly disturbing factors. $C_m$ may be considered the capacitance between the leads 10 and 12 of the cable and would ordinarily be a distributed capacitance of high value, generally substantially exceeding either the capacitance or the capacitance variations to be measured at $C_x$. $C_{xs}$ is the capacitance between the cable sheath 14 and the conductor 10, while capacitance $C_{os}$ is that between the cable sheath 14 and the conductor 12. Each of these ordinarily will be greatly in excess of the capacitance $C_x$ or variations thereof. While the capacitance $C_m$ may be eliminated by shielding from each other the conductors 10 and 12, such shielding in many cases would merely result in increase of the capacitances $C_{xs}$ and $C_{os}$.

In general, these distributed capacitances involved between the cable elements are subject to very considerable variation with temperature and physical layout of the cable and, in particular, would vary from cable to cable in a system in which, as described hereafter, different cables connected to capacitances to be measured are to be subject to connection to a common measuring apparatus. In accordance with the present invention, the measurements desired may be made to a high degree of independence of these distributed capacitances to the extent, for example, that measurements of variation of $C_x$ of the order of 1 micromicrofarad may be made despite the fact that each of the distributed capacitances indicated might be far in excess of even 10,000 micromicrofarads.

The value of the capacitor 44 is indicated as $C_1$, while the value of capacitor 46 is indicated as $C_2$.

In the operation of the described circuit, the resistors 6 and 8 and the capacitors 16 and 18 constitute the desired elements of a conventional bridge excited between terminal 4 and ground and providing an output between terminals 22 and 24 to the amplifier and detector 26. The distributed capacitances which have been discussed form, obviously, highly disturbing elements of this same bridge. When the bridge is unbalanced, the output from terminals 22 and 24 contains two components which may be regarded as a steady component at the frequency of the oscillator 2 and a modulated component comprising a signal of the frequency of the oscillator 2 modulated at the frequency of the chopper 36. The latter component is due to the fact that the alternate connections of the armature 36 to the upper and lower ends of resistor 32 provide variations in gain of the cathode follower circuit comprising the triode 30. Considering this cathode follower circuit, in accordance with conventional operation of such a follower, the cathode always has a potential which is approximately that of the triode grid. As will be evident from the circuit connections, therefore, when the armature 36 is in its upper position, directly connected to the cathode, the sheath 14 of the cable is driven closely to the potential of the conductor 12 which is connected directly to the triode grid. On the other hand, when the armature 36 is in its lower position, the potential of the sheath 14 is, above ground, approximately the fraction of the potential of the triode grid represented by the ratio of the resistance value of resistor 34 to the sum of the resistance values of resistors 32 and 34. A signal is accordingly introduced to the system at the sheath which has a modulating frequency equal to that of the frequency of vibration of the armature 36.

Since, to minimize the effects of the capacitances $C_{os}$ and $C_{xs}$ the sheath should be driven approximately to the potential of conductor 10 (and 12), the resistance at 32 is desirably small compared to the resistance at 34 but sufficient to provide a modulating signal of appreciable magnitude for drive of motor 48. To provide a modulating frequency there may be used an arrangement in which the grid of tube 30 is alternately connected to 22 and 24 with the sheath 14 permanently connected to the cathode.

Neglecting first this modulated input signal to the system, there may be considered the steady signal emitted to the amplifier and detector 26 from terminals 22 and 24 due to unbalance of the bridge. At balance, this signal would be zero, and would reverse 180° in phase depending upon the side of unbalance of the system. Through the detecting action at 26, a reversible direct signal is accordingly applied to motor 50 serving to operate it in one direction or the other, the terminals of the motor being so connected that the capacitor 46 is driven in a direction tending to reduce to zero this component of the output signal.

The modulated signal produces through the amplifier and detector 26 a signal at the frequency of the chopper, which signal has a phase relationship to the chopper driving signal at terminals 42 and, accordingly, to the field excitation from terminals 58 which depends upon the sense of unbalance of the circuit. The motor 48 is accordingly driven in one direction or the other to drive the capacitor 44 in such direction as to reduce the alternating signal to the motor 48 to zero, the connections being so made as to effect drive in such fashion.

Neglecting quadrature components resulting from resistive effects in the circuit, which would ordinarily be negligible in the measurements of capacitances having dielectrics which do not give rise to substantial power losses, balance of the system will be automatically attained when the capacitance $C_2$ plus the capacitance $C_0$ is equal to the capacitance $C_x$ and when capacitance $C_1$ is equal to the difference of capacitances $C_{xs}$ and $C_{os}$. The question might arise as to whether the simultaneous adjustments of the capacitances $C_1$ and $C_2$ would be convergent to the end of securing balance under the conditions just stated. It may be shown both theoretically and in practice that that result is, in fact, the case. In other words, for given conditions of the circuit, balance is secured through the operation of the motors 48 and 50 only when the unique relationships above indicated exist. But if the circuit is such as would produce hunting without special provisions, hunting may be avoided in various fashions. One such fashion is illustrated in Figure 1 wherein the amplifier 53 has its gain controlled to a low value until the output from transformer 54 approaches zero whereupon the gain is increased to operate motor 50. The motors 48 and 50 may be subject to switching to obtain sequential operation. Or the two servo loops could have quite different time constants, e.g. a reactance tube arrangement of very low time constant could provide the capacitance $C_1$. In particular, the useful result is achieved of measuring the difference between $C_x$ and $C_0$ by the value of $C_2$, the capacitor 46 being, if desired, a precision capacitor, the adjustment of which as measured by a scale may be taken as a measure of the difference of the capacitances $C_x$ and $C_0$. It will be evident from the above, furthermore, that the system thus provided is of a null type, giving rise to indications of the capacitance difference independently of the possible variations in the various elements of the measuring circuit connected to the left-hand end of the cable. In particular, high precision of measurement is secured due to the drive of the sheath 14 to approximately the potential of the conductor 12. At balance, the conductor 10 has substantially the same potential as conductor 12 and, consequently, the effects of capacitances $C_{os}$ and $C_{xs}$ are rendered very small despite the possibly large values of these capacitances and the effect of an error in the setting of capacitor 44 is less serious. Capacitance $C_m$ has not been mentioned, but here again, since when balance is attained the potentials of conductors 10 and 12 are substantially equal, the effect of capacitance $C_m$ is substantially eliminated even though the value of this capacitance may be quite large.

It may be noted that the various connections to the terminal 22 might equally well be made to the terminal 24 depending entirely on whether $C_x$ in its range of variation is greater than or less than the capacitance $C_0$.

While the variable capacitor 46 has been shown and described as at the measuring end of the cable, it will be evident that in some cases even more precise results may be secured by causing the motor 50 to drive either the capacitor 16 or 18, such capacitor being made variable. This, of course, involves the presence of a driving motor (or a selsyn receiver) at the remote pickup end of the cable; but this elaboration may well be justified in cases where high precision is required and it is desired, for example, to achieve balance with the capacitances $C_0$ and $C_x$ equal in order to balance out completely some common variable affecting both of these capacitances as, for example, change in dielectric constant due to variations in temperature, or the like. In such a case, the capacitor 46 might be entirely eliminated or might well be a fixed capacitance.

In the elaborate form of the circuit of Figure 1 shown, automatic balance is achieved. However, in a simpler modification, the capacitances $C_1$ and $C_2$ may be adjusted manually to secure zero direct and alternating signals, the motors 48 and 59 being in such case replaced, respectively, by alternating and direct current meters on which zero readings may be secured by the capacitor adjustments. Similarly, manual adjustments of the capacitors 16 or 18 may be effected through remote driving means involving a selsyn transmitter and receiver. If variations of capacitance $C_x$ occur at relatively high frequency (as in seismic recording wherein capacitance $C_x$ is part of a detector), the meter replacing motor 50 might take the form of a recording oscillograph with, of course, departure from null reading procedure, the capacitor 46 being then used only for zero adjustment for the average value of capacitance $C_x$. The frequency of oscillator 2 should then be much greater than the frequency of variation of $C_x$. Numerous other variations in the circuit and the arrangement and drive of elements will be apparent to those skilled in the art from the foregoing description. In particular, reactance tube circuits may provide capacitances $C_1$ and $C_2$ with electrical rather than electromechanical drive, particularly in arrangements requiring high frequency balancing as, for example, in seismic wave detection.

In particular, it will be evident that the measuring apparatus at the left-hand end of the cable may be connected by selective switching to a large number of cables connected to sets of capacitors 16 and 18. Thus, for example, in a tank farm such as used in the oil industry a single measuring apparatus may be utilized through switching to measure capacitances in various tanks, which capacitances may indicate, for example, liquid levels. In particular, the capacitances involved may be of the types described in the application of Shawhan, Serial No. 502,445, filed April 19, 1955. Reference may also be made to the application of Shawhan, Serial No. 449,437, filed August 12, 1954, which discloses various other arrangements of capacitances undergoing measurement at the remote end of a cable, or more generally, the measurement of impedances. If general impedances are substituted for the capacitances at 16 and 18, quadrature output signal components may appear which may be selectively and separately balanced by circuits similar to those involving the capacitors at 44 and 46. Even in such cases where quadrature components are present, the adjustments will be found to be convergent, i.e., balances will be attained only for unique values of settings of adjustable impedances, such settings being attainable automatically or manually.

Resistors 6 and 8 may be replaced by other impedances and it will be evident that other balanceable circuits may be used instead of the bridge shown. In particular, balancing may be effected by manual or automatic adjustment (by motor 50) of a contact 4" of a potentiometer 5" connected between resistors 6" and 8", the last corresponding to resistors 6 and 8.

In the circuit shown in Figure 1, the cable is shown as provided with a pair of capacitors 16 and 18 at its remote pickup end. Under some circumstances, it is desirable to have only a single capacitor, the one to be measured, at the remote end of a connecting cable. An arrangement of this type is shown in Figure 2 in which the elements corresponding to those in Figure 1 are designated by the same numerals primed. In view of the similarity of the two circuits, it will be unnecessary to describe in detail the connections except to point out that since only a single conductor 10' is within the sheath 14' of the cable there is not existent in the cable a distributed capacitance $C_m$ between conductors or a distributed capacitance $C_{os}$ between a second conductor and the sheath. The capacitance corresponding to $C_{os}$ is shown at $C_{os'}$ comprising the fixed capacitor 45' connected in parallel with the variable capacitor 44'. The capacitance $C_0$ of Figure 1 has corresponding to it the fixed capacitor 18'. It will be evident from consideration of Figure 2 in comparison with Figure 1 that the operation is fundamentally identical, balance being attained under corresponding conditions of automatic or manual adjustment of the capacitors 44' and 46'. Obviously, as previously described, the capacitor 16' may be automatically or manually variable to secure balance. The circuit of Figure 2 is also adapted for the measurement of impedances in general which may be substituted for the capacitor 16', the other elements being modified to correspond thereto.

It will be evident that numerous variations may be made in the embodiments of the invention without departing from the principles thereof, and, accordingly, the invention is not to be regarded as limited except as required by the following claims.

What is claimed is:

1. An apparatus comprising a cable having a conductive sheath and at least one conductor extending through said sheath and insulated therefrom, a variable impedance connected to said conductor at one end of the cable, means connected to said impedance and to said conductor at the other end of the cable and providing with said cable and impedance a balanceable circuit, means coupled to said circuit at said other end of the cable and providing alternating excitation to said circuit, means connected to said sheath and said conductor and responsive to a difference of potential thereof for driving said sheath to approximately the potential of said conductor, and means coupled at said other end of the cable to said balanceable circuit and providing a signal indicative of unbalance of said circuit.

2. An apparatus comprising a cable having a conductive sheath and at least one conductor extending through said sheath and insulated therefrom, a variable impedance connected to said conductor at one end of the cable, means connected to said impedance and to said conductor at the other end of the cable and providing with said cable and impedance a balanceable circuit, means coupled to said circuit at said other end of the cable and providing alternating excitation to said circuit, means connected to said sheath and said conductor and responsive to a difference of potential thereof for driving said sheath to approximately the potential of said conductor, means coupled at said other end of the cable to said balanceable circuit and providing a signal indicative of unbalance of said circuit, and means responsive to said signal for automatically balancing said circuit.

3. An apparatus comprising a cable having a conductive sheath and at least one conductor extending through said sheath and insulated therefrom, a variable impedance connected to said conductor at one end of the cable, means connected to said impedance and to said conductor at the other end of the cable and providing with said cable and impedance a balanceable circuit, means coupled to said circuit at said other end of the cable and providing alternating excitation to said circuit, said first means comprising a second variable impedance for balancing the first mentioned variable impedance, means connected to said sheath and said conductor and responsive to a difference of potential thereof for driving said sheath to approximately the potential of said conductor, means coupled at said other end of the cable to said balanceable circuit and providing a signal indicative of unbalance of said circuit, and means responsive to said signal and coupled to said second variable impedance for automatically varying said second variable impedance to balance the circuit.

4. An apparatus comprising a cable having a conductive sheath and at least a pair of conductors extending through said sheath and insulated therefrom and from each other, a pair of impedances, at least one of which is variable, connected respectively to said conductors at one end of the cable, means connected to said impedances and to said conductors at the other end of the cable and providing with said cable and impedances a balanceable circuit, said means comprising a second variable impedance for balancing the difference between the impedances of said pair, means coupled to said circuit at said other end of the cable and providing alternating excitation to said circuit, means connected to said sheath and one of said conductors and responsive to a difference of potential thereof for driving said sheath to approximately the potential of the last mentioned of said conductors, and means coupled at said other end of the cable to said balanceable circuit providing a signal indicative of unbalance of said circuit.

5. An apparatus comprising a cable having a conductive sheath and at least a pair of conductors extending through said sheath and insulated therefrom and from each other, a pair of impedances, at least one of which is variable, connected respectively to said conductors at one end of the cable, means connected to said impedances and to said conductors at the other end of the cable and providing with said cable and impedances a balanceable circuit, said means comprising a second variable impedance for balancing the difference between the impedances of said pair, means coupled to said circuit at said other end of the cable and providing alternating excitation to said circuit, means connected to said sheath and one of said conductors and responsive to a difference of potential thereof for driving said sheath to approximately the potential of the last mentioned of said conductors, means coupled at said other end of the cable to said balanceable circuit providing a signal indicative of unbalance of said circuit, and means responsive to said signal and coupled to said second variable impedance for automatically varying said second variable impedance to balance said circuit.

References Cited in the file of this patent

UNITED STATES PATENTS

| | | |
|---|---|---|
| 2,081,690 | Unk | May 25, 1937 |
| 2,718,620 | Howe | Sept. 20, 1955 |

UNITED STATES PATENT OFFICE

CERTIFICATE OF CORRECTION

Patent No. 2,923,880                  February 2, 1960

Fred M. Mayes

It is hereby certified that error appears in the above numbered patent requiring correction and that the said Letters Patent should read as corrected below.

In the grant, lines 1, 2, and 3, for "Fred M. Mayes, of Newtown Square, Pennsylvania," read -- Fred M. Mayes, of Newtown Square, Pennsylvania, assignor to Sun Oil Company, of Philadelphia, Pennsylvania, a corporation of New Jersey, --; line 12, for "Fred M. Mayes, his heirs" read -- Sun Oil Company, its successors --; in the heading to the printed specification, line 3, for "Fred M. Mayes, Newtown Square, Pa." read -- Fred M. Mayes, Newtown Square, Pa., assignor to Sun Oil Company, Philadelphia, Pa., a corporation of New Jersey --.

Signed and sealed this 26th day of July 1960.

(SEAL)
Attest:

KARL H. AXLINE                            ROBERT C. WATSON
Attesting Officer                     Commissioner of Patents